United States Patent
Muralidharan et al.

(10) Patent No.: US 11,648,901 B1
(45) Date of Patent: May 16, 2023

(54) OCCUPANT PROTECTION SYSTEM

(71) Applicant: Zoox, Inc., Foster City, CA (US)

(72) Inventors: Nirmal Muralidharan, San Mateo, CA (US); Haley Riesenberg, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/591,434

(22) Filed: Feb. 2, 2022

(51) Int. Cl.
| | |
|---|---|
| *B60R 21/207* | (2006.01) |
| *B60R 21/215* | (2011.01) |
| *B60R 21/01* | (2006.01) |
| *B60R 21/0132* | (2006.01) |
| *B60R 21/16* | (2006.01) |
| *B60R 21/00* | (2006.01) |

(52) U.S. Cl.
CPC ........ *B60R 21/0132* (2013.01); *B60R 21/207* (2013.01); *B60R 21/215* (2013.01); *B60R 2021/0053* (2013.01); *B60R 2021/01231* (2013.01); *B60R 2021/168* (2013.01)

(58) Field of Classification Search
None
See application file for complete search history.

(56) References Cited

U.S. PATENT DOCUMENTS

| | | | |
|---|---|---|---|
| 9,283,916 B2 * | 3/2016 | Nagasawa | B60R 21/231 |
| 11,214,214 B2 * | 1/2022 | Thomas | B60R 21/2338 |
| 2019/0337427 A1 * | 11/2019 | Thomas | B60N 2/427 |

FOREIGN PATENT DOCUMENTS

| | | | | |
|---|---|---|---|---|
| EP | 1873022 A1 * | 1/2008 | ....... | B60R 21/01516 |
| GB | 2518771 A * | 4/2015 | ........... | B60R 21/207 |
| JP | 2008007036 A * | 1/2008 | ....... | B60R 21/01516 |
| JP | 2008162546 A * | 7/2008 | | |

* cited by examiner

*Primary Examiner* — Faye M Fleming
(74) *Attorney, Agent, or Firm* — Lee & Hayes, P.C.

(57) ABSTRACT

A seat for a vehicle includes an occupant protection system. The occupant protection system includes an airbag or other barrier that at least partially occludes an opening to a volume under a vehicle seat. The occupant protection system may reduce or prevent lower leg injury and/or retain cargo in the volume during a collision event.

20 Claims, 8 Drawing Sheets

OCCUPANT PROTECTION SYSTEM

BACKGROUND

During vehicle collisions, injuries to occupants of the vehicle may result from the occupant contacting a surface and/or object inside the vehicle during the collision. As the difference between the speed of the occupant and the speed of the surface and/or object the occupant contacts increases, the force to which the occupant is subjected also increases, thereby increasing the likelihood or severity of injury to the occupant during the collision. Conventional airbags attempt to reduce the effects of collisions by preventing or reducing the likelihood of the occupant's upper body contacting an interior surface and/or object, and/or reducing the difference between the speed of the occupant and the speed of any surface the occupant contacts. However, conventional airbags may not provide sufficient protection to an occupant's lower body during certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
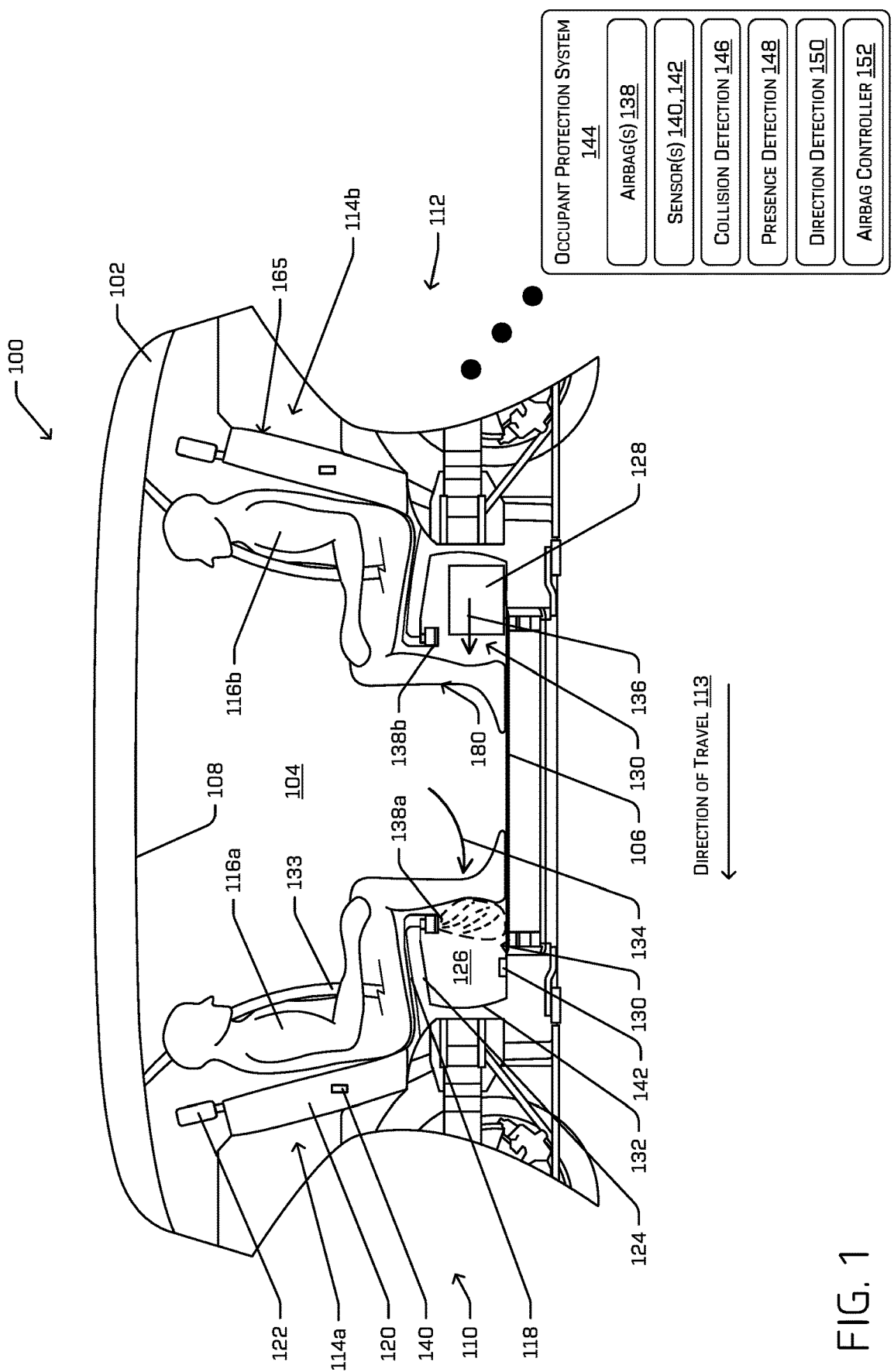
FIG. 1 is a cutaway side view of an example vehicle illustrating an example implementation of an occupant protection system.

As mentioned above, conventional occupant protection systems, such as airbags, safety restraints, or the like have focused on protecting an occupant's upper body. However, some vehicle designs and/or types of collisions may cause injuries to an occupant's lower body. Aspects of this disclosure provide improved systems and techniques for lower body protection.

In aspects of this disclosure, a vehicle defines a passenger compartment and one or more seats are disposed in the passenger compartment. In examples, the seats are configured to support a seated occupant above a floor of the passenger compartment, and a volume is defined below or under a seat. For example, the volume may provide storage for an occupant's belongings or cargo.

The open volume can conveniently provide storage to the occupant, but during certain collision events, the open volume may provide a potentially dangerous condition. For example, when an occupant seated in the seat is facing opposite a direction of travel, e.g., the occupant is facing away from the front of the vehicle, a front-end collision can result in the occupant's legs being forced into the volume under the seat. The occupant may be injured as a result of their legs contacting something in the volume at high speed and/or as a result of excessive bending of the occupant's legs, e.g., over-flexing at the knee. Moreover, when a seat is facing a direction of travel, cargo stowed in the volume under the front-facing seat may be ejected from the volume during a frontal-collision. This ejected cargo may harm an occupant's legs in front of the volume and/or the cargo may end up loose in the passenger compartment, resulting in potential injury to passengers and/or damage to the vehicle. Ejected cargo may otherwise form an unsafe projectile under certain (e.g., collision) events.

Aspects of this disclosure include providing a barrier that is selectively placed over an opening to a volume under the seat when a collision event is detected. In some examples, the barrier includes an airbag that, when inflated in response to a collision event, is disposed to at least partially block or occlude an opening to an under-seat volume. For example, the airbag may be incorporated into the seat and when inflated, will extend toward a floor of the vehicle. In other examples, the airbag may be coupled to the floor and when inflated, will extend toward the bottom of the seat.

According to aspects of this disclosure, an airbag may be deployed to occlude an opening to an under-seat volume based at least in part on a determination of a collision event associated with the vehicle. In still further aspects, techniques described herein include deploying an airbag based on additional information about the vehicle. For instance, aspects of this disclosure can include determining whether an occupant is present in a seat. For instance, one or more occupant detection sensors can be associated with seats in the vehicle and configured to generate sensor data used to determine whether a seat is occupied. For example, it be unnecessary (and/or undesirable) to deploy an airbag associated with a seat that is not occupied. Additional aspects of this disclosure can include determining whether cargo is stowed in an under-seat volume. For instance, one or more cargo detection sensors can be associated with the under-seat volumes and configured to generate sensor data used to determine whether cargo is stowed under a seat. For example, it may unnecessary (and/or undesirable) to deploy an airbag or associated with a seat that has no associated stowed cargo. Moreover, aspects of this disclosure can include determining a direction of travel of the vehicle and/or a direction associated with individual of the seats in the vehicle.

In example aspects of this disclosure, techniques described herein can selectively inflate airbags based at least in part on the information just discussed. For example, responsive to a collision event, an airbag controller may inflate an airbag associated with any rear-facing, occupied seat and/or with any forward-facing seat having cargo stowed thereunder.

The techniques and systems described herein may be implemented in a number of ways. Example implementations are provided below with reference to the figures.

FIG. 1 is a side cutaway view of a portion of a vehicle 100 according to aspects of this disclosure. For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

As shown in FIG. 1, the vehicle 100 includes a body 102 defining an interior 104 of the vehicle 100. The interior 104 generally defines a passenger compartment. As also illustrated, the interior 104 extends generally in a vertical direction from a floor 106 to a ceiling 108. The interior 104 also extends in a longitudinal direction, e.g., between a first end 110 of the vehicle 100 and a second end 112 of the vehicle 100. The interior 104 also has a lateral dimension, e.g., normal to the viewing plane of FIG. 1, between opposite sides of the vehicle 100 (the sides having been removed for clarity). As will be appreciated, the body 102 and other aspects of the vehicle 100 are shown for example only.

The example vehicle 100 may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, any combination thereof, and/or any other suitable power sources. Although the example vehicle 100 has four wheels, the systems and methods described herein may be incorporated into vehicles having fewer or a greater number of wheels, tires, and/or tracks. The example vehicle 100 may have four-wheel steering and may operate generally with equal performance characteristics in all directions. Specifically, the vehicle 100 may be configured for bi-directional travel, such that when the vehicle is travelling in a direction of travel 113 (from right to left in FIG. 1) the first end 110 of the vehicle 100 is the leading end of the vehicle 100 and the second end 112 is the trailing end of the vehicle 100, and when the vehicle 100 is travelling in a direction opposite the direction of travel 113 the second end 112 is the leading end of the vehicle 100 and the first end 110 becomes the trailing end of the vehicle 100. These example characteristics may facilitate greater maneuverability, for example, in small spaces or crowded environments, such as parking lots and urban areas.

A first seat 114a and a second seat 114b (collectively, "the seats 114") are disposed in the interior 104 of the vehicle 100. In the example of FIG. 1, a first occupant 116a is seated in the first seat 114a, and a second occupant 116b is seated in the second seat 114b. Collectively, the first occupant 116a and the second occupant 116b may be referred to herein as "the occupants 116," and one of the first occupant 116a or the second occupant 116b (or some other occupant not in FIG. 1) may be referred to generically as "the occupant 116." The seats 114 include a seat portion 118 on which the occupant 116 sits. The seat portion 118 is configured to support at least a portion of a weight of the occupant 116. The seat portion 118 may include various contours, cushions, and/or other functional and/or aesthetic features. The seats also include a seatback portion 120. As in some conventional seats, a portion of a back of the occupant 116 may rest against or otherwise contact the seatback portion 120 when the occupant 116 is seated in the seat portion 118.

The seats 114 also include a headrest 122, for supporting at least a back of the occupant's 116 head.

As also illustrated in FIG. 1, the seat portion 118 is raised relative to the floor 106. Accordingly, the passenger's feet may rest on the floor 106 when the user is seated. Also in the example of FIG. 1, a bottom 124 of the seat portion 118 is spaced from the floor 106 to define, at least partially, a cavity or volume 126 under the seat portion 118, e.g., behind the legs of the occupant 116. The volume 126 may be positioned to provide storage, e.g., for belongings of the occupants 116, for comfort items, such as blankets, pillows, or the like, and/or any other cargo such as luggage, purses, backpacks, etc. For instance, FIG. 1 schematically illustrates cargo 128 stowed in the volume 126 under the second seat 114b. In the illustrated example, the cargo 128 rests on the floor 106 inside the volume 126.

The volume 126 is illustrated in FIG. 1 as being defined vertically by a height extending from the floor 106 to the bottom 124 of the seat portion 118. The volume 126 also has a depth, e.g., along the longitudinal direction of the vehicle 100, and a width, e.g., along a lateral direction of the vehicle 100 (normal to the view of FIG. 1). In more detail, the depth of the volume 126 extends from an opening 130, e.g., through which the volume 126 is accessed from the interior 104 of the vehicle 100, to a wall 132. Accordingly, the opening 130 may be at least partially behind the passenger's lower leg. The width of the volume 126 may extend between laterally-spaced surfaces (not shown in FIG. 1). The laterally-spaced surfaces may be spaced by a width of the vehicle, a width of the seat, or some other width. Although the volume 126 is generally shown and described as being bounded by certain surfaces, structures, or the like, the volume 126 may be any volume at least partially between the floor 106 and the bottom of the seat portion 118, behind a seated occupant's legs.

The seats 114 of FIG. 1 are arranged carriage-style, e.g., such the first occupant 116a and the second occupant 116b are facing each other. Accordingly, regardless of the direction of travel, one of the occupants will face the direction of travel and the other will have their back to the direction of travel. Although the example of FIG. 1 includes only the first seat 114a and the second seat 114b, the first seat 114a may be one of a plurality of aligned first seats, e.g., a first row of seats, and/or the second seat 114b may be one of a plurality of aligned second seats, e.g., a second row of seats. Moreover, although the first seat 114a and the second seat 114b are illustrated as supporting a single occupant 116, in other examples the seats 114 may be disposed as benches on which more than one occupant may sit. Other relative arrangements and numbers of the seats 114 also are contemplated. Without limitation, all the seats 114 may be arranged to face in a same direction, more or fewer seats may be provided, e.g., a third or more rows can be disposed in the interior 104, or the like.

With specific reference to the example of FIG. 1, when the vehicle 100 travels in the direction of travel 113, the first occupant 116a is rear-facing and the second occupant 116b is forward-facing. Also when travelling in the direction of travel 113, should the vehicle come to an abrupt stop, e.g., as a result of a rapid deceleration resulting from a collision or impact at the first end 110 of the vehicle, the occupants 116 will experience different forces associated with the deceleration differently. Specifically, a head of the first occupant 116a head will be forced against the headrest portion 122 of the first seat 114a, the back of the first occupant 116a will be forced against the seatback portion the first seat 114a. In contrast, the inertia of the second occupant 116*b* will cause the second occupant to continue to move in the direction of travel 113, tending to move the second occupant relative to (and out of) the second seat 114*b*. Some conventional safety systems have been implemented in vehicles to mitigate the effects of the forces just described. Without limitation, the headrest 122 can be configured to support the occupant's head and neck. The seats 114 can also include a seat belt 133 to prevent occupants, e.g., the second occupant 116*b* in the example, from being ejected from the second seat 114*b*. Conventional safety systems, like those just described, have primarily focused on protecting an occupant's head, neck, and/or body. Aspects of this disclosure provide additional safety systems to reduce or eliminate harm to occupants and/or damage to the vehicle associated with the volume 126.

More specifically, and continuing the example of the collision with the vehicle 100 moving in the direction of travel 113, because of the volume 126 under the first seat 114*a*, the lower legs of the first occupant 116*a* will continue to move during a collision event, e.g., into the volume 126 along a direction generally illustrated by an arrow 134. This continued movement may cause a portion of the lower leg to violently contact an object or surface inside the volume 126 under the first seat 114*a* and/or a surface or object at least partially defining the volume 126 under the first seat 114*a*. This contact can result in injury to the lower leg, e.g., ankle, tibia and/or fibula damage, contusions, and/or the like. The movement can also, or alternatively, cause knee injuries resulting from the (over)bending of the knee resulting from the continued movement of the lower leg into the volume 126.

The second occupant 116*b*, facing the direction of travel 113, may be less likely to experience similar injuries. However, as illustrated in the example of FIG. 1, the cargo 128 stowed in the volume 126 will experience a force, generally in the direction illustrated by an arrow 136 during the example collision event. This force may cause the cargo 128 to be ejected from under the second seat 114*b*. The ejected cargo 128 can contact the lower legs of the second occupant 116*b*, causing injury to the second occupant 116*b* and/or damage to the cargo 128. Moreover, the cargo 128 may enter the passenger compartment, potentially causing injury to other occupants in the vehicle and/or damaging components in the passenger compartment.

Aspects of this disclosure may be particularly directed to reducing injuries and/or damage associated with the volume 126 and/or the cargo 128 stowed in the volume 126, such as just described. Specifically, the vehicle 100 includes a first airbag 138*a* associated with the volume 126 under the first seat 114*a* and a second airbag 138*b* associated with the volume 126 under the second seat 114*b*. The first airbag 138*a* and the second airbag 138*b* may be collectively referred to herein as "the airbags 138." The airbags 138 are configurable between a deflated or stowed configuration, illustrated by the second airbag 138*b*, and an inflated configuration, shown by the dashed lines associated with the first airbag 138*a*. In the example, the airbags are coupled to the seats 114, e.g., proximate the bottoms 124 of the seats 114. In this position, during inflation the airbags extend toward the floor 106. Although the example of FIG. 1 shows that the inflated airbag may contact the floor 106, this contact may not be required in other examples.

The airbags 138, in the inflated configuration, at least partially occlude the openings 130. Accordingly, and continuing the example discussed above of a collision event with the vehicle 100 travelling in the direction of travel 113, the first airbag 138*a* can provide a surface against which the back of the legs of the first occupant 116*a* may contact during the collision event. Thus, the first airbag 138*a* can prevent over-articulation of the lower leg of the first occupant 116*a* and/or impact of the lower leg with objects and/or surfaces associated with the volume 126 under the first seat 114*a*. The second airbag 138*b* can be deployed similarly to the first airbag 138*a*, e.g., to an inflated configuration that at least partially occludes the opening 130 to the volume 126 under the second seat 114*b*. While the legs of the second occupant 116*b* may be forced away from the opening 130 (and away from the inflated second airbag 138*b*), the second airbag 138*b* may prevent the cargo 128 from passing through the opening 130 and into the passenger compartment by use of a first and second attachment mechanism associated with the second airbag 138*b* which allows the second airbag 138*b* to become a barrier when in the inflated configuration. The first and second attachment mechanism that can be associated with the second airbag 138*b* are discussed more in detail below. Of course, the first airbag 138*a* may also help retain cargo in the volume under the first seat 114*a* with a similar first and second attachment mechanism as used in the second airbag 138*b*, e.g., which cargo may experience forces after an initial collision that could force the cargo opposite the direction of travel 113. Similarly, the second airbag 138*b* may also support a recoil of the lower legs of the second occupant 116*b*.

In some example implementations, the vehicle 100 can be configured such that (all of) the airbags 138 are configured to deploy or inflate in response to a collision event, as discussed above. In still further examples, however, and as discussed further below, aspects of this disclosure may also facilitate selectively inflating (fewer than all of) the airbags 138 based on additional information about the vehicle 100. For example, the vehicle 100 is illustrated as including one or more occupant detection sensors 140 and one or more cargo detection sensors 142. Generally, the occupant detection sensors 140 are configured to generate data associated with a presence/absence of the occupant 116 in the seat and the cargo detection sensors 142 are configured, generally, to generate data associated with a presence/absence of the cargo 128 in the volume 126.

In the example of FIG. 1, the occupant detection sensors 140 are illustrated as being coupled to, or integrated into, the seatback portion 120 of the seats 114. However, in other examples the occupant detection sensors 140 can be coupled to, or incorporated into, the seat portion 118 and/or any other portion of the seats 114. For example, and without limitation, the occupant detection sensors 140 may include pressure sensors, weight sensors, or other types of sensors that generate data from which it can be determined that some mass is in the seat. In still further examples, the occupant detection sensors 140 can be embodied as other types of sensors, e.g., cameras, imaging sensors, or the like, that generate data that can be used to determine presence of the occupant(s) 116. For example, if one of the seats 114 is unoccupied, it may be unnecessary and/or undesirable to deploy the airbag 138 associated with that seat. In addition to determining a presence of an occupant, the occupant detection sensors 140 may also determine data associated with attributes of the occupant. Without limitation, the occupant detection sensors 140 can be used to determine physical properties of occupants, such as weight, height, or the like. For instance, if an occupant of a seat is below a certain height, it may be unnecessary and/or undesirable to deploy the airbag 138 associated with that seat.

In the example of FIG. 1, the cargo detection sensors 142 are illustrated as being coupled to or otherwise disposed on the floor 106. For instance, the cargo detection sensors 142 may be pressure sensors, weight sensors, or the like. In other examples, the cargo detection sensors 142 may disposed other than on the floor 106, e.g., coupled to some portion of the seats 114, coupled to the wall 132, and/or otherwise situated. Also in examples, the cargo detection sensors 142 may any type of sensor configured to generate data associated with a presence and/or absence of objects, e.g., the cargo 128, in the volume 126. Without limitation, the cargo detection sensors 142 can be photoelectric sensors, proximity sensors, inductive sensors, capacitive sensors, and/or other sensors. For example, if there is no cargo under a seat, it may be unnecessary and/or undesirable to deploy the airbag 138 associated with that seat.

FIG. 1 schematically illustrates an occupant protection system 144, which may include functionality to deploy the airbags 138. Specifically, the occupant protection system 144 includes the airbags 138 and the sensors 140, 142, as well as a collision detection component 146, a presence detection component 148, a direction detection component 150, and an airbag controller 152. The collision detection component 146, the presence detection component 148, the direction detection component 150, and/or the airbag controller 152 may be embodied as one or more computing components configured to perform functionality associated with the occupant protection system 144. Although illustrated separately, some or all aspects of the occupant protection system 144 may be combined.

The collision detection component 146 may include functionality to determine that the vehicle 100 is involved in a collision. Alternatively, or additionally, the collision detection component 146 may include functionality to determine that a collision is imminent. Without limitation, the collision detection component can receive data about an acceleration (or deceleration) of the vehicle, about objects in the environment of the vehicle, from a prediction system configured to determine a likelihood of a collision with an object, and/or other types of data from other sources.

The presence detection component 148 includes functionality to determine the presence of objects in the vehicle 100. For example, the presence detection component 148 can receive data from the occupant detection sensors 140 and, based at least in part on that data, determine the seats 114 that are occupied. The presence detection component 148 can also, or alternatively, receive data generated by the cargo detection sensors 142 and, based at least in part on that data, determine the seats 114 that have cargo thereunder. In examples, the presence detection component 148 may make a first binary determination of whether a given seat has an occupant and/or a second binary determination of whether a given seat has stowed cargo associated therewith.

The direction detection component 150 includes functionality to determine a direction of travel of the vehicle 100. For instance, in the example discussed above the direction detection component 150 can determine that the vehicle 100 is travelling in the direction of travel 113. The direction detection component 150 can determine the direction of travel 113 based at least in part on any one of sensor data, heading data, route planning data, map data, and/or other data. The direction detection component 150 can also, or alternatively, determine a direction associated with each of the seats 114 and/or of the occupants 116 of the seats 114. For instance, in the example of FIG. 1, the direction detection component 150 may determine that the first seat 114a is a rearward-facing seat and that the second seat 114b is a forward-facing seat. As discussed above, the direction a passenger faces relative to the direction of travel will influence the forces experienced by that passenger during a collision event.

The airbag controller(s) 152 include functionality to inflate one or more of the airbags 138, that is, to cause the airbags 138 to be configured in the inflated configuration discussed above. In examples, the airbag controller(s) 152 receive data from one or more of the collision detection component 146, the presence detection component 148, and/or the direction detection component 150. For instance, the airbag controller(s) 152 can cause inflation of one or more of the airbags 138 based at least in part on information from the collision detection component 146 indicating that a collision event has occurred or is imminent. In another example, the airbag controller(s) 152 can cause inflation of one or more of the airbags 138 based at least in part on information from the presence detection component 148. For instance, the airbag controller(s) 152 may deploy airbags associated with seats that have either cargo thereunder or that have occupants. In this example, if no cargo or occupant is associated with a seat, the airbag controller(s) 152 may not deploy the airbag associated with that seat, e.g., even with the collision event. In a still further example, the airbag controller(s) 152 can cause inflation of one or more of the airbags 138 based at least in part on information from the direction detection component 150 indicating a direction of travel and/or an orientation of the seats. For instance, the airbag controller(s) 152 can deploy airbags associated with any occupied rear-facing seat, e.g., regardless of whether cargo is stowed under the seat. As discussed above, the airbags 138 may provide improved safety outcomes for rear-facing occupants, e.g., by providing a cushion or barrier to movement of the occupant's legs in the direction of the arrow 136. The airbag controller(s) 152 may also deploy airbags for forward-facing seats that have stowed cargo, e.g., regardless of whether the seat is occupied. For example, the airbags 138 associated with the forward-facing seats may be particularly well-suited to prevent stowed cargo from becoming projectiles, but may not provide any appreciable benefit for forward-facing occupants. Of course, these are examples only, intended to demonstrate various functionality of the airbag controller(s) 152; other functionality is disclosed herein, and/or will be appreciated with the benefit of this disclosure.

Figure 2B:
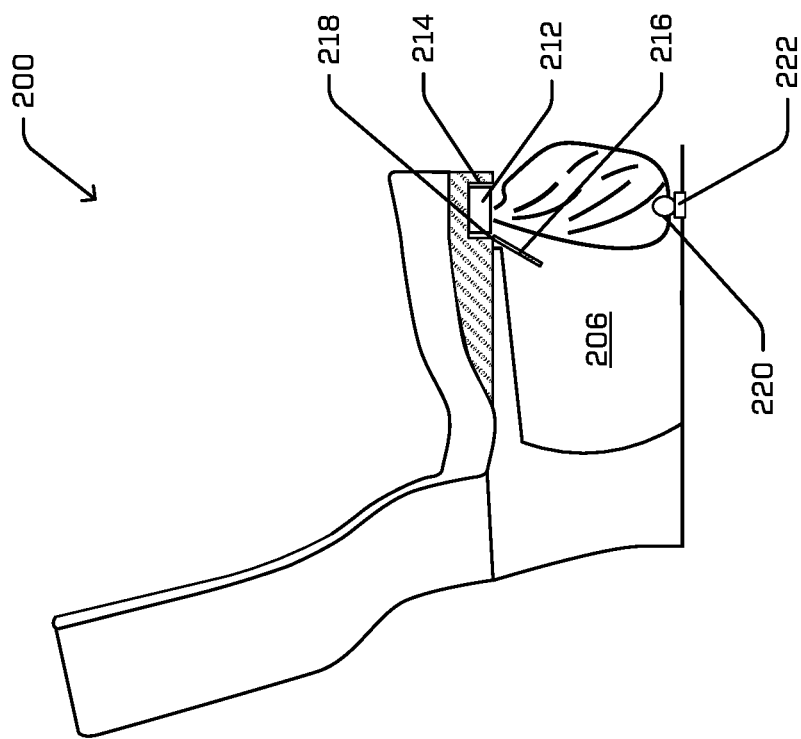
FIGS. 2A and 2B are cutaway side views of a portion of another example vehicle, illustrating additional aspects of this disclosure.
Figure 2A:
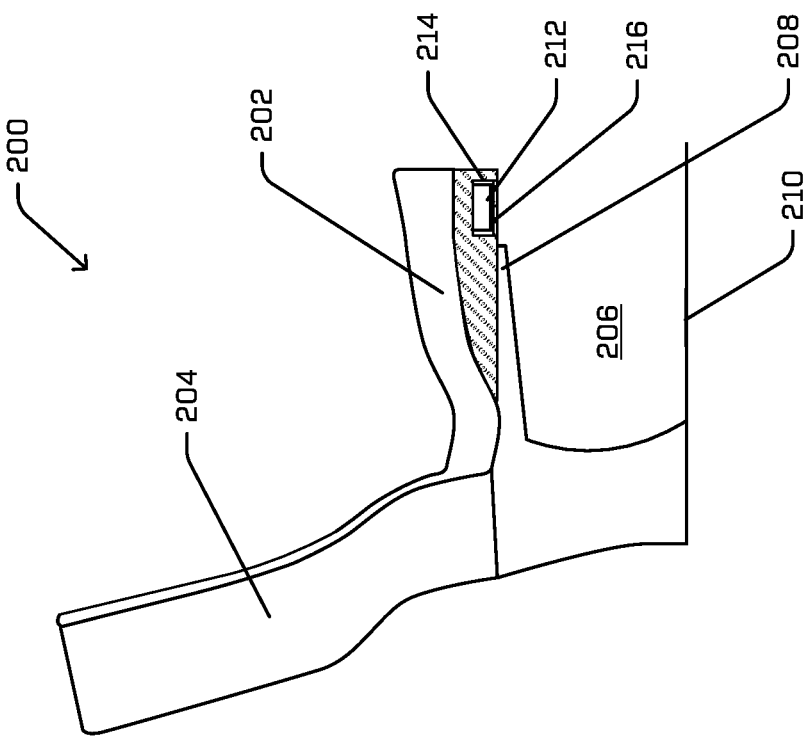

FIGS. 2A and 2B are side views of a portion of a vehicle including a seat 200, which may be the first seat 112a or the second seat 112b of the vehicle 100 shown in FIG. 1. The seat 200, like the seats 114, includes a seat portion 202, and a seatback portion 204. The seat 200 may also include a headrest portion and/or other components. As with the seats 114, the seat 200 is configured such that a volume 206 is defined under the seat 200, e.g., between a bottom 208 of the seat portion 202 and a floor 210. The seat 200 also includes an airbag 212, which may be the same as, or similar to, the airbags 138. FIG. 2A shows the airbag 212 in a stowed or uninflated state or configuration, and FIG. 2B shows the airbag 212 in an inflated state or configuration.

In the example of FIGS. 2A and 2B, the airbag 212 is integrated into the seat 200. Specifically, in FIG. 2, the seat 200 includes a cavity 214 that opens at the bottom 208 of the seat portion 202. The cavity 214 is sized, shaped, and/or otherwise configured to receive the airbag 212. More specifically, the cavity 214 may retain a housing of the airbag 212, e.g., with the airbag 212 in an uninflated or stowed state. As also shown in FIG. 2A, a cover 216 is disposed over the airbag 212 in the undeployed state, e.g., to occlude the cavity 214. The cover 216 may be a panel or other member sized to occlude the cavity 214. For instance, the cover 216 may function to keep foreign objects from contacting the airbag 212 in the cavity 214 and/or to keep dirt, debris or the like out of the cavity 214. The cover 216 may be configured, e.g., shaped, contoured, colored, or the like, to be integrated into the seat 200.

The cover 216 also is configured for movement relative to the seat 200. Specifically, in FIG. 2A, when the airbag 212 is not inflated, the cover 216 occludes the cavity 214. However, when the airbag 212 is inflated, the cover 216 moves to allow the airbag 212 to inflate.

FIG. 2B, shows the seat 200 after the airbag 212 has been deployed, causing the cover 216 to move. Specifically, in the example of FIG. 2B, the cover 216 has pivoted, proximate a rear edge 218 thereof, relative to the bottom 208 of the seat 200, to expose the cavity 214. For instance, the cover 216 may be hinged relative to the bottom 208 of the seat 200 at the rear edge 218. Accordingly, the cover acts as a flap to selectively cover the cavity 214 or allow the airbag 212 to inflate. In examples, the inflating airbag 212 may have sufficient force to cause the movement of the cavity 214, e.g., by overcoming any force holding the cover 216 in the position shown in FIG. 2A. The cover 216 may open in the manner shown, e.g., into the volume 206, such that the airbag 212 acts as a barrier that prevents the cover 216 contacting an occupant of the seat 200 or otherwise entering a passenger compartment.

Moreover, the airbag 212 itself may act as a barrier. For instance, the airbag 212 may be configured to be retained in a deployed or extended position. For instance, in FIG. 2B, the airbag 212 is illustrated as including an associated first attachment mechanism 220, e.g., proximate a distal end of the airbag 212. The first attachment mechanism 220 is configured to cooperate with a second attachment mechanism 222 opposite the space from the cavity 214, e.g., across the opening into the volume 206 from the cavity 214. Specifically, the first attachment mechanism 220 and the second attachment mechanism are configured to selectively couple, e.g., to secure the airbag 212 in the deployed configuration illustrated. In examples, the attachment mechanisms can include magnets, latches, and/or any other releasably coupled arrangement. In the example of FIG. 2B, the second attachment mechanism 222 is shown extending above, e.g., in the vertical direction of the figure, the floor 210. In some examples, the second attachment mechanism 222 may act as a passive restraint to prevent objects from sliding out of the volume 206. In examples, a lip or step may be provided on the floor 210 for similar passive restraint. The second attachment mechanism 222 may be disposed on or integrated into such a feature, or the second attachment mechanism 222 may be separate therefrom. To provide additional stability to the airbag 212 once deployed, the airbag 212 may be deployed in a webbing, netting, or the like. In this arrangement, the webbing or netting may be coupled via the first and second attachment mechanisms 220, 222 upon deployment. For example, the webbing or netting may act as a pocket or other volume that expands with the inflation of the airbag 212.

Modifications to the cover 216 also are contemplated. For example, instead of being configured to open into the volume 206, the cover 216 may be configured to pivot in a different direction, e.g., away from the volume 206 (into a passenger compartment), or laterally. Also, the cover 216 may be configured to form a barrier when it has pivoted in order to at least partially cover cargo, luggage, and/or any other items in volume 206 from damaging person or property. For example, when the cover 216 pivots it may lock into place within the volume 206, e.g., via an associated attachment mechanism that keeps the cover 216 in a fixed position to act as a barrier. In still further examples, the cover 216 may include more than one panel, each configured to pivot in a different direction. For instance, the cover may include two portions, one pivoting as in the example of FIG. 2B, and another pivoting in a different direction. In still further examples, the cover 216 may be configured to completely detach from the seat 200. For instance, the cover 216 may be held in place by one or more tabs, or other releasable attachments, and the force of the inflating airbag may cause the cover to detach from the seat 200. In other examples, the cover 216 may be defined by a frangible coupling, score marks and/or some other destructible attachment. In other examples, the cover 216 may be omitted entirely.

As illustrated in FIG. 2B, and regardless of the cover 216 arrangement, when the airbag 212 is configured in the inflated configuration, the inflating bladder extends from the cavity 214 toward the floor 210. In the illustration, the airbag 212 contacts the floor 210, although in other examples the airbag 212 may not extend all the way to the floor.

Figure 3:
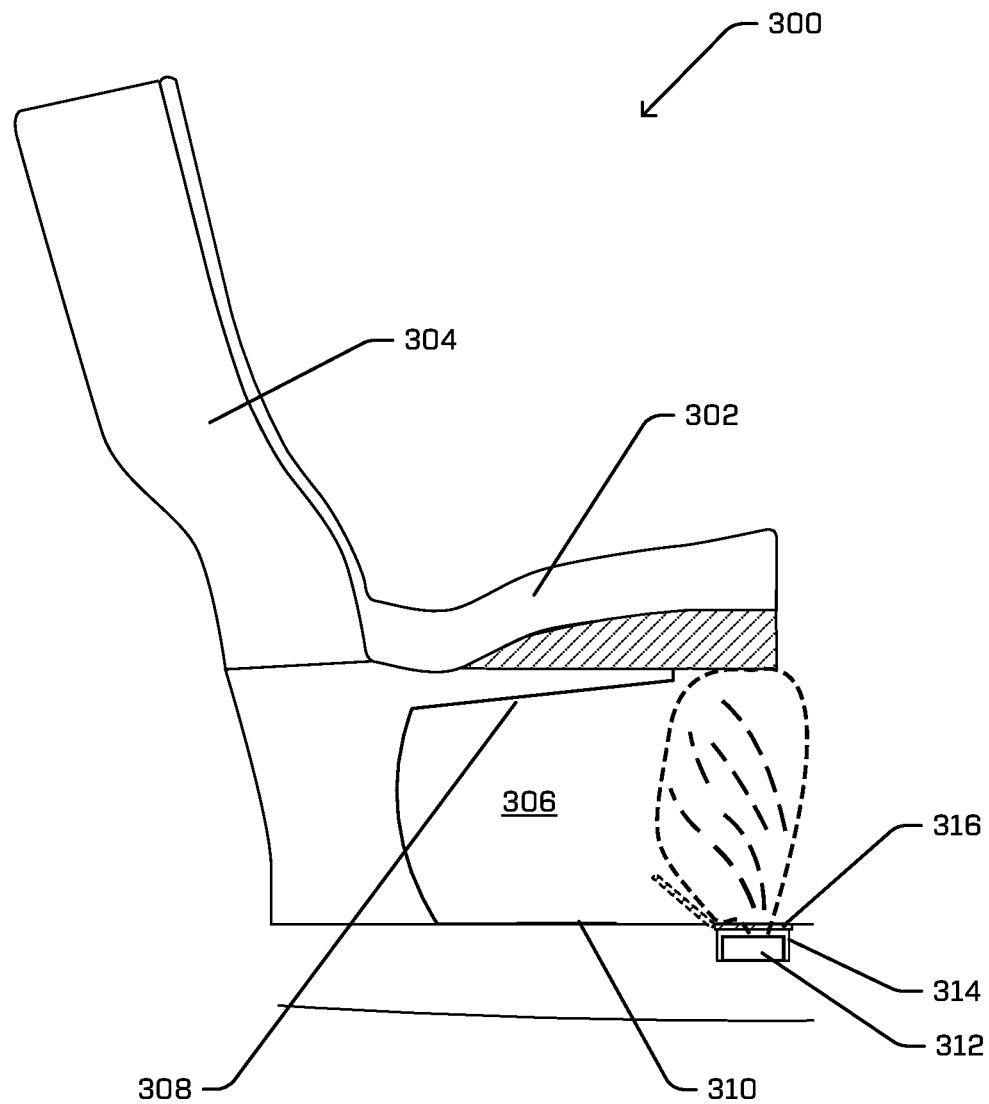
FIG. 3 is a cutaway side view of a portion of another example vehicle, illustrating additional implementations of this disclosure.

Although the example of FIGS. 1, 2A, and 2B show an airbag, when inflated, extending from a position proximate a bottom of a seat toward a floor, in other examples the airbag may be otherwise positioned. FIG. 3 shows an alternative arrangement.

Specifically, FIG. 3 shows a portion of a vehicle, which may be the vehicle 100, that includes a seat 300, which may the first seat 112a or the second seat 112b of the vehicle 100 shown in FIG. 1. The seat 300, like the seats 114, includes a seat portion 302, and a seatback portion 304. The seat 300 may also include a headrest portion and/or other components. As with the seats 114, the seat 300 also is configured such that a volume 306 is defined under the seat 200, e.g., between a bottom 308 of the seat portion 302 and a floor 310. In this example, as with previous examples, the vehicle includes an airbag 312. Specifically, solid lines are used to show the airbag 312 in a stowed or uninflated state or configuration, and dashed lines show the airbag 312 in an inflated state or configuration.

In the example of FIG. 3, unlike the airbags 138 and the airbag 212, the airbag 312 is spaced from the seat 300. Specifically, the floor 310 includes a cavity 314 formed therein, and the cavity 314 is sized, shaped, and or otherwise configured to receive the airbag 312. More specifically, the cavity 314 may retain a housing of the airbag 312, e.g., with the airbag 312 in an uninflated or stowed state.

As also shown in FIG. 3, a cover 316 is disposed over the airbag 312 in the undeployed state, e.g., to occlude the cavity 314. The cover 316 may be a panel or other mechanism sized to occlude the cavity 314. For instance, the cover 316 may function to keep foreign objects from contacting the airbag 312 in the cavity 314 and/or to keep dirt, debris and/or the like out of the cavity 214. The cover 316 may be configured, e.g., shaped, contoured, colored, or the like, to be integrated into the floor 310.

The cover 316 also is configured for movement relative to the floor 310. Specifically, and as shown in solid lines in FIG. 3, when the airbag 312 is not inflated, the cover 316 occludes the cavity 314. However, when the airbag 312 is inflated, as shown in dashed lines, the cover 316 is moved relative to the cavity 314. The cover 316 may be configured like and function in the same manner as the cover 216 discussed above. The airbag 312, like the airbags 138 and/or the airbag 212, at least partially occludes an opening to the volume 306 when deployed. Thus, for example, the airbag 312 provides the same functionality as discussed above in connection with the airbags 138 and/or the airbag 212, but the airbag is coupled to the floor 310 and extends toward the bottom 308 of the seat 300 when inflated, instead of extending in a direction away from the seat 300. Other modifications and arrangements also are contemplated. For example, two airbags may be provided, e.g., one disposed at the seat to inflate toward the floor and a second disposed at the floor to inflate toward the bottom of the seat. For example, the two airbags may be configured to contact each other at a vertical position spaced from the seat and the floor. In still further examples, one or more airbag may be disposed proximate a lateral side or sides of the volume. Such laterally-disposed airbag(s) may be configured to inflate in a lateral direction to occlude the opening to the volume.

Figure 4A:
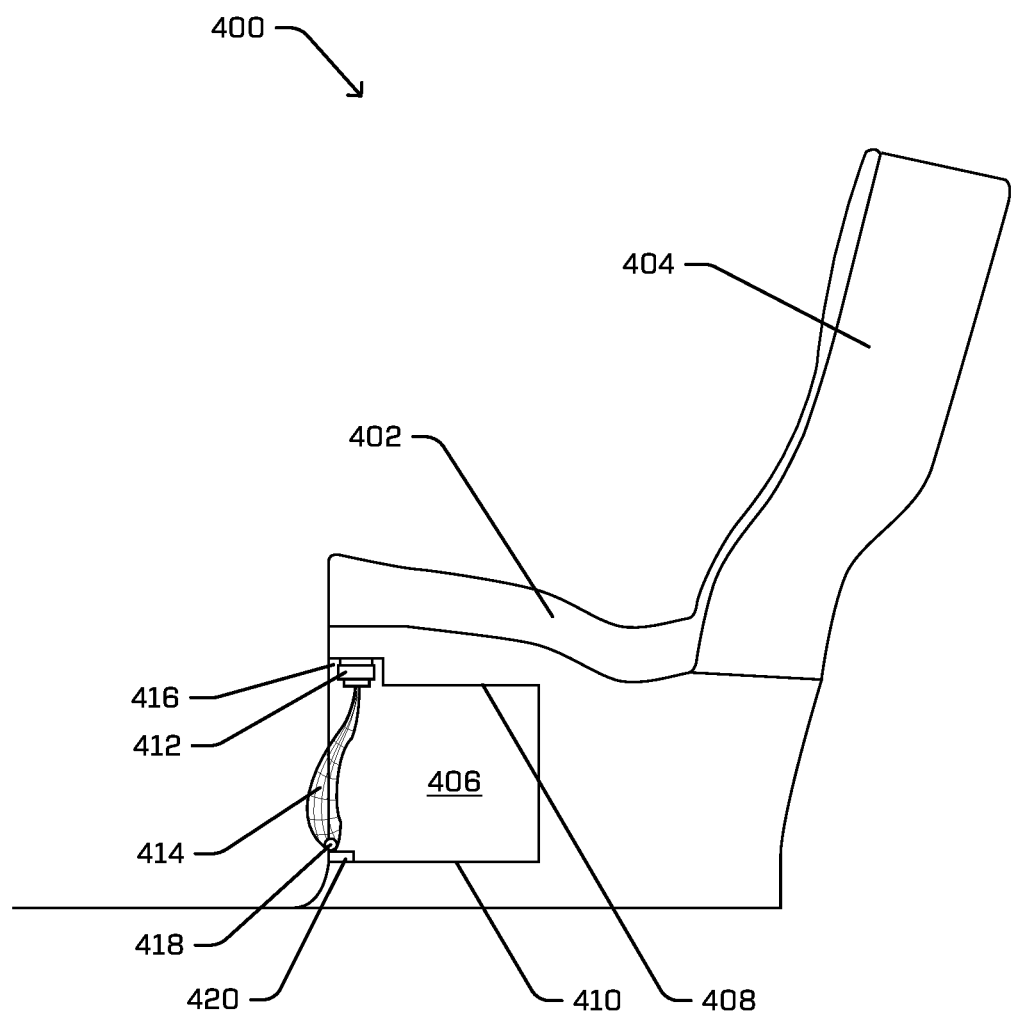
FIGS. 4A and 4B are cutaway side views of portions of additional example vehicles, illustrating additional aspects of this disclosure.
Figure 4B:
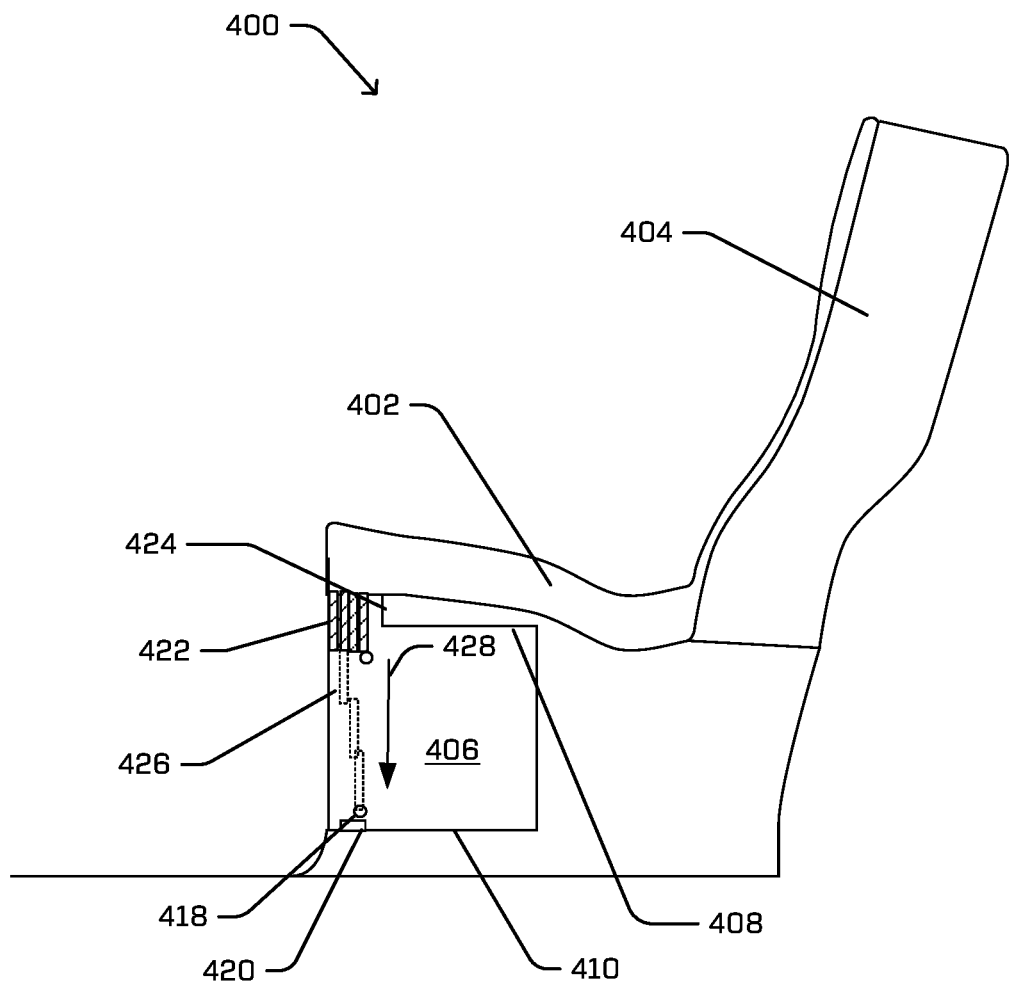

In the examples of FIGS. 1, 2A, 2B, and 3, an airbag is deployed to occlude an opening to a volume under a seat. However, aspects of this disclosure contemplate deploying other types of barriers to occlude the opening to the volume. Specifically, FIGS. 4A and 4B show an alternative example in which a net is provided as a barrier. In more detail, FIGS. 4A and 4B show a portion of a vehicle including a seat 400, which may be the first seat 112a or the second seat 112b of the vehicle 100 shown in FIG. 1. The seat 400, like the seats 114, includes a seat portion 402 and a seatback portion 404. The seat 400 may also include a headrest portion and/or other components. As with the seats 114, the seat 400 is configured such that a volume 406 is defined under the seat 400, e.g., between a bottom 408 of the seat portion 402 and a floor 410.

In the example of FIG. 4A, the seat 400 also includes a net housing 412 configured to house or retain a deployable net 414. Specifically, the deployable net 414 may be stowed in the housing 412 and selectively deployed to occlude an opening to the volume 406. Thus, the deployable net 414 may function similar to the airbags 138, 212, 312, in that it also is selectively deployed to occlude the opening. In examples, the net 414 may be comprised of one or more of cotton, hemp, flax, manila, sisal, nylon, polyester, polypropylene, polyethylene, or other conventional material.

In the example of FIG. 4A, the net housing 412 is integrated into the seat 400, e.g., in a cavity 416, but other configurations may be used. Without limitation, the housing 412 may be disposed proximate a bottom of the volume 406, e.g., such that the net 414 is deployed upward, toward the bottom 408 of the seat 400.

As also shown in FIG. 4A, the deployable net 414 may have an associated first attachment mechanism 418 proximate a distal end thereof. The first attachment mechanism 418 is configured to cooperate with a second attachment mechanism 420 opposite the space from the housing 412, e.g., across the opening into the volume 406 from the housing. The first attachment mechanism 418 and the second attachment mechanism 420 are configured to cooperate, e.g., to secure the net 414 in the deployed configuration illustrated. The net 414 may be deployed at a speed which ensures that such net is fully deployed before any cargo, luggage, and/or other items in volume 406 may become projectiles and potentially cause damage to person and/or property.

In examples, the attachment mechanisms can include magnets, latches, and/or any other releasably coupled arrangement. Although not illustrated in FIG. 4A, in some examples, lateral edges of the net 414 may be disposed in tracks, e.g., to facilitate controlled deployment of the net 414. Controlled deployment of the net 414 may better align the attachment mechanisms 418, 420, for example.

The net 414 may perform the same functions as the airbags discussed above. Moreover, although FIG. 4A shows the presence of the net 414 instead of airbags, in other examples both an airbag and an additional barrier, such as the net 414 may be provided at a seat. For example, in response to a collision event, both the net 414 and an airbag may be deployed. Alternatively, aspects of this disclosure can include selectively deploying only the net 414 or the airbag. For instance, the net 414 may be preferred for retaining cargo in a volume under a seat, whereas an airbag may be preferred to protect an occupant's legs.

FIG. 4B shows another alternative example of a barrier that can be used as an alternative, or in addition, to the airbags discussed herein. In more detail, FIG. 4B shows a physical barrier 422, embodied as one or more a collapsible barriers, arranged to at least partially occlude the opening to the volume 406. In more detail, FIG. 4B shows the seat 400 including the seat portion 402 and the seatback portion 404. The seat 400 also defines the volume 406 under the seat 400, e.g., between the bottom 408 of the seat portion 402 and the floor 410. The physical barrier 422 is configured to extend to at least partially block or occlude an opening into the volume 406 when deployed. In examples, at least a portion of the foldable bar 422 may be stowed in the housing 424 and selectively deployed to occlude the opening to the volume 406.

As shown in FIG. 4B, the physical barrier 422 is a collapsible or folding bar. The physical barrier 422 may be configurable in either a stowed state or configuration (shown in solid lines) or a deployed state or configuration 426 (shown in dashed lines). In the example, the barrier 422 is fixed to the seat 400 and extends, in the deployed configuration 426, away from the bottom 410 of the seat portion 402. Although FIG. 4B illustrates the barrier 422 as being deployed in a direction 428 from the seat bottom 408 to the floor 410, in other examples the barrier 422 may be deployed in a different direction, e.g., from the floor 410 toward the seat bottom 408 and/or in a lateral direction.

In the example of FIG. 4B, the physical barrier 422 includes a number of links or segments that facilitate collapsibility of the barrier 422. For example, and without limitation, the segments may be connected via hinges, pivots, slides, and/or other features that allow the segments to move relative to each other (and relative to the seat 400) to achieve the deployed arrangement. Unlike, the airbags discussed herein, which may lose shape and/or stiffness quickly after deployment, the physical barrier 422, in the deployed configuration 426, may provide a longer-term barrier, e.g., to retain objects in the volume 406. Because a passenger's legs may contact the barrier 422, in examples, the barrier 422, while substantially rigid, may have sufficient flexibility, deformability, or other resiliency to prevent harm to the passenger.

In examples, the barrier 422 may be retained in the stowed state and selectively deployed. For instance, and without limitation, the barrier 422 may have an associated actuator that causes deployment. In other examples, the barrier 422 may be retained in the deployed state by a latch, clasp, cover, or other physical obstruction that, once move, allows the barrier 422 to deploy. For example, the barrier 422 gravity and/or some loading force may cause the barrier 422 to deploy with the obstruction moved. In one non-limiting example, a cover, like the cover 216 may be provided to retain both the airbag 212 and the barrier 422 in a stowed state. Accordingly, when the cover is moved, e.g., through a force applied by the deploying airbag, the barrier 422 will also deploy.

As also shown in FIG. 4B, the barrier 422 may have an associated first attachment mechanism 428 proximate a distal end thereof. The first attachment mechanism 428 is configured to cooperate with a second attachment mechanism 430 opposite the housing 424, e.g., across the opening into the volume 406 from the housing. The first attachment mechanism 428 and the second attachment mechanism 430 are configured to cooperate, e.g., to secure the barrier 422 in the deployed state 426. In examples, the attachment mechanisms can include magnets, latches, and/or any other releasably coupled arrangement. Thus, the barrier 422 may function similar to the net 414 and/or the airbags 138, 212, 312, in that it also is selectively deployed to at least partially occlude the opening.

The barrier 422 shown in FIG. 4B is only one example. Other arrangements also are contemplated. For instance, and without limitation, the collapsible bar(s) may extend laterally, e.g., parallel to the floor 410. In other instances, the barrier 422 may be rolled about a spindle and extended from the spindle to occlude the opening. In still further examples, the barrier may include folds, pleats, or the like that allow for selective collapsibility, to facilitate stowing/deployment. In still further examples, the barrier 422 may include one or more laterally-extending panels, and lateral edges of the panels are retained in a track. The panels/edges may move in the track during deployment. Without limitation, when stowed, the panel(s) may be arranged under the seat bottom 408, and deploy, via the track to a position occluding the opening. Other arrangements that facilitate selective stowing/deployment will be appreciated with the benefit of this disclosure.

Figure 5:
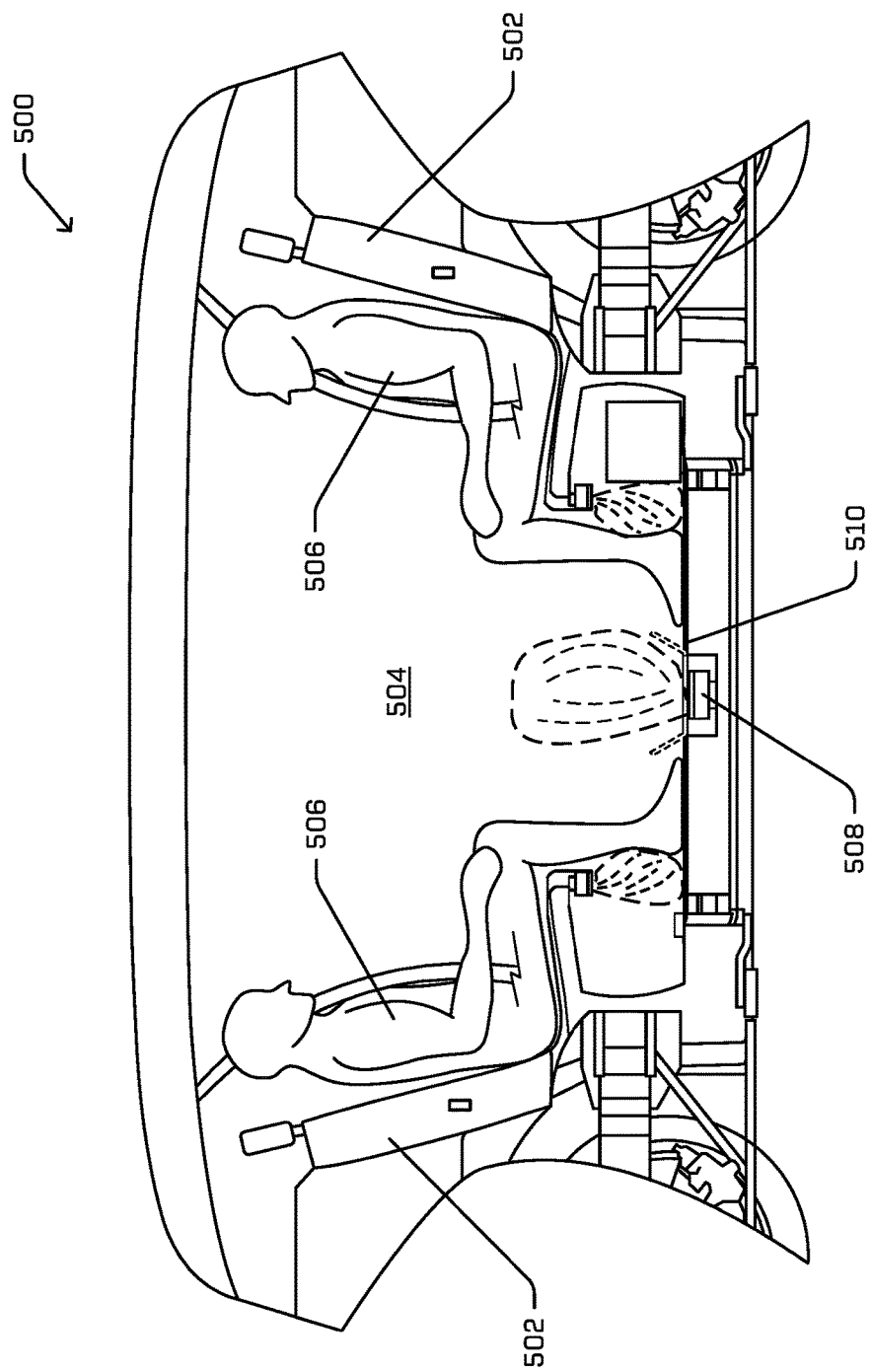
FIG. 5 is a cutaway side view of another example vehicle, illustrating additional aspects of this disclosure.

FIG. 5 is another cutaway side view of an example vehicle 500, illustrating another example implementation of a lower leg protection system. In FIG. 5, the vehicle 500 may be substantially identical to the vehicle 100. For instance, the vehicle 500 includes seats 502 disposed in an interior 504 of the vehicle 500. Occupants 506 sit in the seats 502 to be transported by the vehicle 500. However, the vehicle 500, unlike the vehicle 100, includes an additional airbag 508 disposed in a floor 510 of the interior 504, e.g., between the seats 502. The additional airbag 508 may be substantially identical to the airbag 312 discussed above in connection with FIG. 3. However, unlike the airbag 312, the additional airbag is configured to be inflated into the interior 504 of the vehicle 500 between the occupants. FIG. 5 shows the airbag 508 in an inflated configuration in dashed lines.

The additional airbag 508 can provide additional protection to an occupant's lower legs, specifically, in the event the lower legs experience a force away from the seat in which the occupant is seated. For example, a forward-facing passenger's lower legs may continue to move forward in response to a collision at a front end of the vehicle 500. Deployment of the additional airbag 508 in this scenario can reduce injury, e.g., which injury may result from the occupant's legs contacting an object, such as a facing passenger or seat and/or from hyperextension of the occupant's legs. Although the example of FIG. 5 shows the additional airbag 508 as a single, centrally-located airbag, in other examples multiple instances of the additional airbag 508 also may be provided, e.g., one for each seat, for each pair of facing seats, one for each leg, and/or the like.

Figure 6:
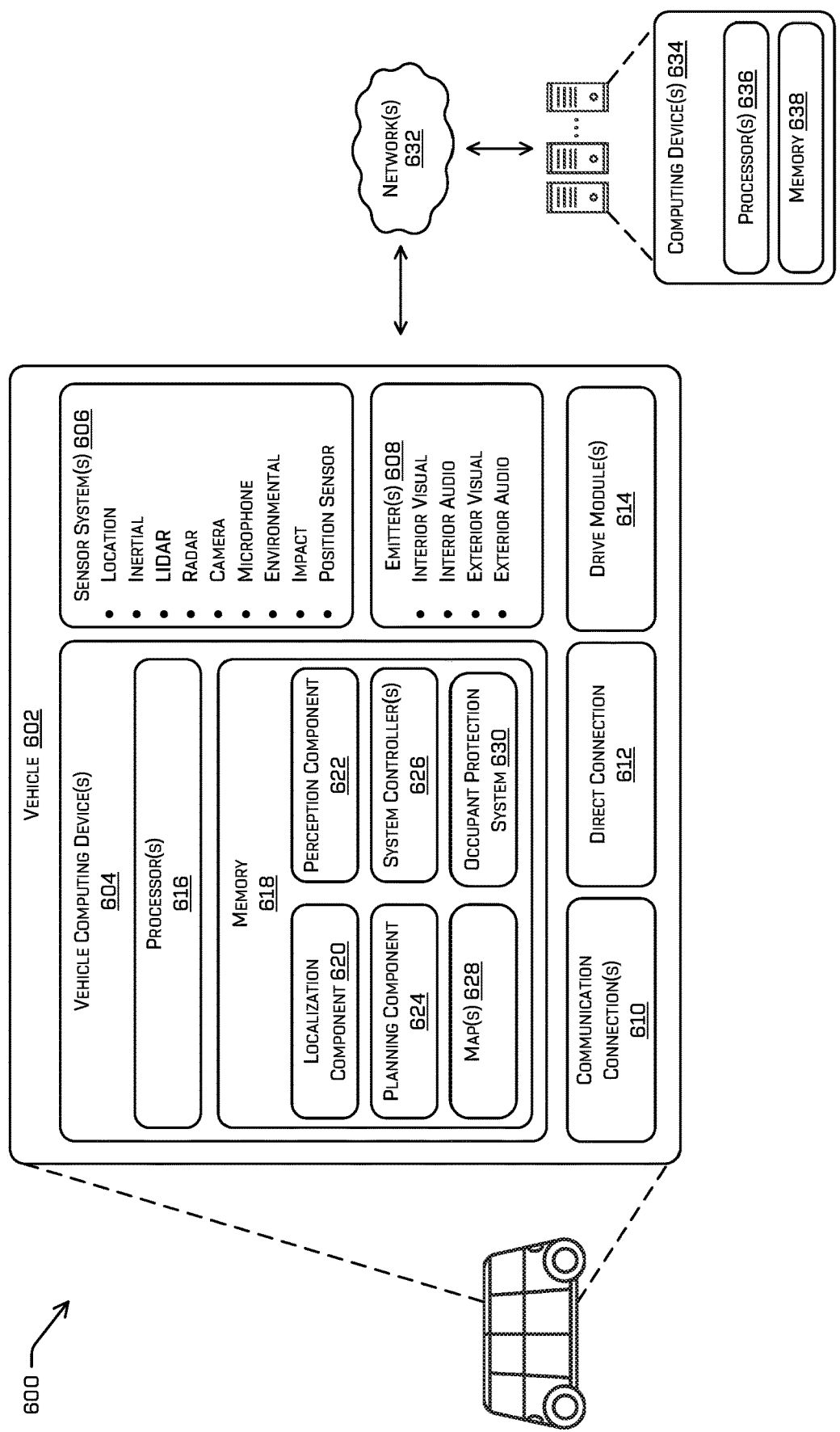
FIG. 6 is a block diagram of an example system architecture for implementing example techniques described herein.

FIG. 6 is a block diagram of an example system architecture for implementing the example techniques described herein. In at least some examples, the system 600 may include a vehicle 602, which may correspond to the example vehicle 100 shown in FIG. 1. The vehicle 602 may include a vehicle computing device 604, one or more sensor system(s) 606, one or more emitters 608, one or more communication connections 610, at least one direct connection 612, and one or more drive modules 614. The vehicle computing device 604 may include one or more processors 616 and memory 618 communicatively coupled with the one or more processors 616. In the illustrated example, the vehicle 602 is an autonomous vehicle. However, the vehicle 602 may be any other type of vehicle. In the illustrated example, the memory 618 of the vehicle computing device 604 stores a localization component 620, a perception component 622, a planning component 624, one or more system controllers 626, one or more map(s) 628, and an occupant protection system 630. Though depicted in FIG. 6 as residing in memory 618 for illustrative purposes, it is contemplated that the localization component 620, the perception component 622, the planning component 624, the one or more system controllers 626, the one or more maps 628, and the occupant protection system 630 may additionally, or alternatively, be accessible to the vehicle 602 (e.g., stored on, or otherwise accessible by, memory remote from the vehicle 602).

In some examples, the one or more of sensor system(s) 606, the localization component 620, the perception component 622, or the planning component 624 may generate one or more triggering signals due to a predicted collision or actual collision involving the vehicle 602. For example, one or more of the sensor system(s) 606 may generate one or more signals indicative of an object (e.g., another vehicle, a wall, a guardrail, a bridge support, a utility pole, and/or a pedestrian) and communicate the one or more signals to the perception component 622 and/or the planning component 624, which may predict a collision with an object in the environment through which the vehicle 602 is travelling.

Regarding the example system 600 shown in FIG. 6 in at least some examples, the localization component 620 may be configured to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some examples, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 620 may provide data to various components of the vehicle 602 to determine an initial position of an autonomous vehicle for generating a candidate trajectory, as discussed herein.

In some examples, the perception component 622 may be configured to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In at least one example, the planning component 624 may determine a location of a user based on image data of an environment received from the user using, for example, bags of binary words with image-based features, artificial neural network, and the like. Further, the planning component 624 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In at least one example, the planning component 624 may determine a pickup location based at least in part on determining a user identity (e.g., determined via image recognition or received as an indication from a user device, as discussed herein).

The vehicle computing device 604 also includes the system controller(s) 626, which may be configured to control steering, propulsion, braking, safety, emitters, communication, and other systems of the vehicle 602. These system controller(s) 626 may communicate with and/or control corresponding systems of the drive module(s) 614 and/or other components of the vehicle 602.

The map(s) 628 may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 628 may include at least one map (e.g., images and/or a mesh). In some examples, the vehicle 602 may be controlled based at least in part on the maps 628. That is, the maps 628 may be used in connection with the localization component 620, the perception component 622, and/or the planning component 624 to determine a location of the vehicle 602, identify objects in an environment, and/or generate routes and/or trajectories to navigate within an environment.

In some examples, the one or more map(s) 628 may be stored on a remote computing device(s) (such as computing device(s) 634) accessible via one or more network(s) 632. In some examples, multiple maps 628 may be stored based on, for example, a characteristic (e.g., type of entity, time of day, day of week, season of the year, etc.). Storing multiple maps 628 may have similar memory requirements but increase the speed at which data in a map may be accessed.

The occupant protection system 630 may be the same as the occupant protection system 144 detailed above. For instance, and without limitation, the occupant protection system 630 can include functionality to determine a collision event, determine the presence of occupant(s) in the vehicle 602, determine a presence of cargo under a seat of the vehicle 602, and/or determine a direction of travel of the vehicle. Based at least in part on any of this information, all of this information, and/or any other information, the occupant protection can cause a barrier, such as an airbag, a net, or the like, to occlude a volume under a seat, e.g., to prevent injury to the occupant of the seat and/or to prevent cargo under the seat from ejecting from the volume. Other functionality of the occupant protection system 630 is detailed further herein.

In some examples, aspects of some or all of the components discussed herein may include any models, algorithms, and/or machine learning algorithms. For example, in some examples, the components in the memory 618 and/or the memory 634 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. Without limitation, the sensor system(s) 606 can include the sensors 140, 142 discussed above. The sensor system(s) 606 may include multiple examples of each of these or other types of sensors. For example, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or alternatively, the sensor system(s) 606 may send sensor data, via the one or more networks 632, to the one or more computing device(s) 634 at a particular frequency, after a lapse of a predetermined period of time, in near real-time, etc.

The emitter(s) 608 may be configured to emit light and/or sound. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The communication connection(s) 610 enable communication between the vehicle 602 and one or more other local or remote computing device(s). For example, the communication connection(s) 610 may facilitate communication with other local computing device(s) on the vehicle 602 and/or the drive module(s) 614. Also, the communication connection(s) 610 may allow the vehicle 602 to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 632. For example, the communications connection(s) 610 may enable Wi-Fi-based communication, such as via frequencies defined by the IEEE 802.11 standards, short range wireless frequencies such as Bluetooth®, cellular communication (e.g., 2G, 3G, 4G, 4G LTE, 6G, etc.) or any suitable wired or wireless communications protocol that enables the respective computing device to interface with the other computing device(s).

In at least one example, the direct connection 612 may provide a physical interface to couple the one or more drive module(s) 614 with the body of the vehicle 602. For example, the direct connection 612 may allow the transfer of energy, fluids, air, data, etc. between the drive module(s) 614 and the vehicle 602. In some examples, the direct connection 612 may further releasably secure the drive module(s) 614 to the body of the vehicle 602.

In at least one example, the vehicle 602 may include the drive module(s) 614. In some examples, the vehicle 602 may have a single drive module 614. In at least one example, if the vehicle 602 has multiple drive modules 614, individual drive modules 614 may be positioned on opposite ends of the vehicle 602 (e.g., the leading end and the rear, etc.). In at least one example, the drive module(s) 614 may include one or more sensor systems to detect conditions of the drive module(s) 614 and/or the surroundings of the vehicle 602. By way of example and not limitation, the sensor system(s) 606 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The drive module(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller, which may receive and preprocess data from the sensor system(s) 606 and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 also include one or more communication connection(s) that enable communication by the respective drive module with one or more other local or remote computing device(s).

In at least one example, the localization component 620, perception component 622, the planning component 624, and/or the occupant protection system 630 may process sensor data, as described above, and may send their respective outputs, over the one or more network(s) 632, to one or more computing device(s) 634. In at least one example, the localization component 620, the perception component 622, the planning component 624, and/or the occupant protection system 630 may send their respective outputs to the one or more computing device(s) 634 at a particular frequency, after a lapse of a predetermined period of time, in near real-time, etc.

The processor(s) 616 of the vehicle 602 and/or the processor(s) 636 of the computing device(s) 631 may include any suitable processor capable of executing instructions to process data and perform operations as described herein. By way of example and not limitation, the processor(s) 616, 636 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 638 are examples of non-transitory computer-readable media. The memory 618 and 638 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 634, and/or components of the computing device(s) 634 may be associated with the vehicle 602. That is, the vehicle 602 may perform one or more of the functions associated with the computing device(s) 634 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example system 600 shown in FIG. 6 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 600 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated system 600. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the system 600 may be transmitted to the system 600 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 100 is discussed below.

Figure 7:
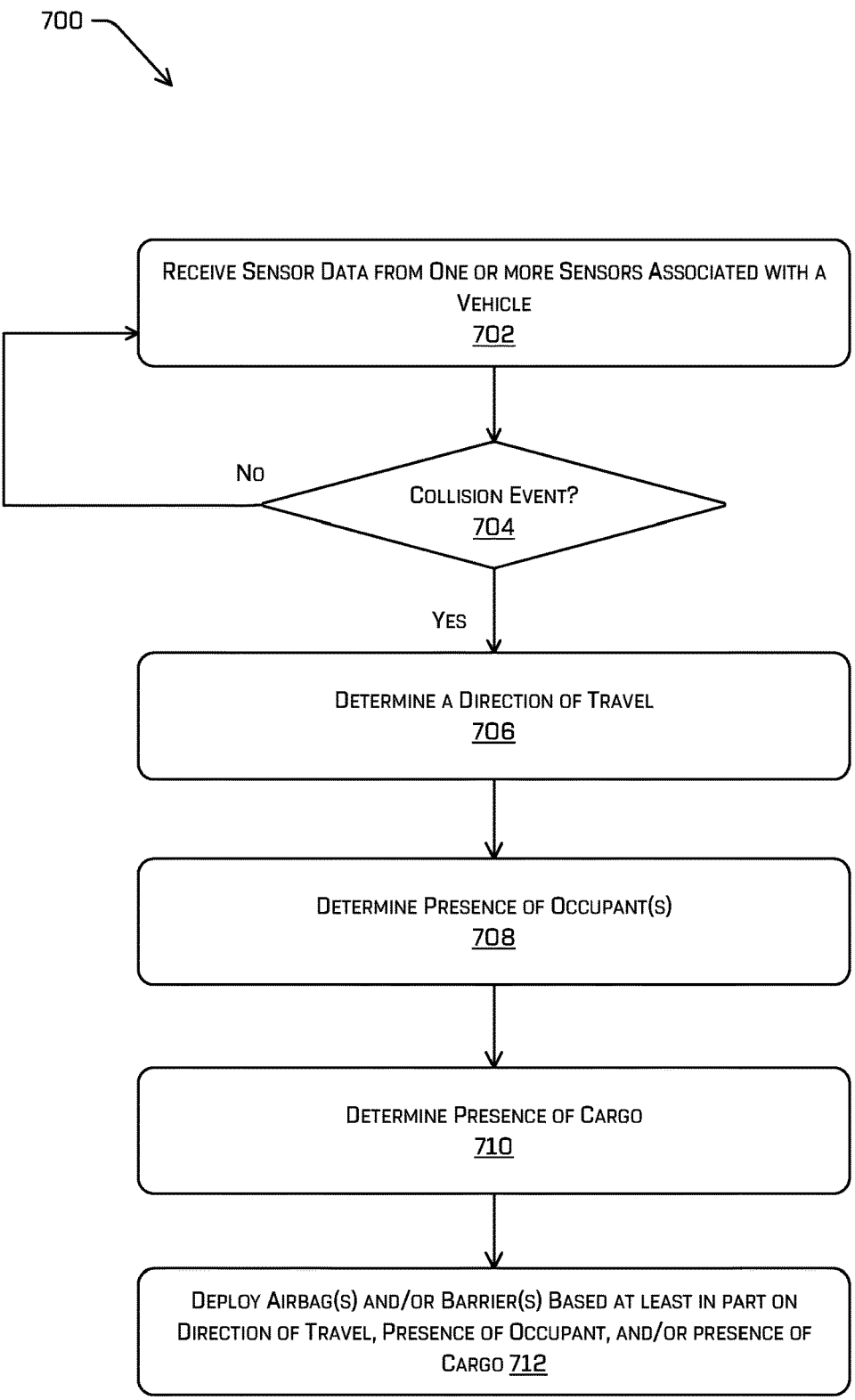
FIG. 7 is a flow diagram of an example process for implementing an occupant protection system according to aspects of this disclosure.

FIG. 7 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

More specifically, FIG. 7 is a flow diagram of an example process 700 for protecting an occupant of a vehicle. At an operation 702, the process 700 includes receiving sensor data from one or more sensors associated with a vehicle. For example, the sensors can include the sensor system(s) 606, the occupant detection sensors 140, the cargo detection sensors 142, and/or any other sensors that generate sensor data associated with a vehicle. Without limitation, the sensors from which data is received at the operation 702 can include location sensors, position sensors, proximity sensors, inertial sensors, LIDAR sensors, camera sensors, microphone sensors, environmental sensors, impact sensors, and/or other sensor modalities.

At an operation 704, the process 700 includes determining whether a collision event exists. For example, the operation 704 can include determining, based at least in part on the sensor data received at 702 that the vehicle has been involved in a collision, or that a collision is imminent. As stated above, vehicle 100 may utilize sensor data such a LIDAR information to determine the surroundings of the environment around 102. Such surroundings may contain obstacles, objects, people, other vehicles, among other things. The systems may receive the sensor information and make a determination, with prediction algorithms, such as machine learning models, and determine that there will be a collision of an imminent collision involving vehicle 100.

If, at the operation 704 it is determined that the there is a collision event, at an operation 706 the process 700 includes determining a direction of travel of the vehicle. As stated above, the vehicle 100 may move in a bidirectional manner. As such, any seat, depending on the direction of travel, may be forward- or rear-facing. For example, the operation 704 may be carried out by the direction detection component 150 discussed above.

At an operation 706, the process 700 includes determining a presence of one or more occupants. For example, as discussed above, the seats 114 of the vehicle 100 may include the associated occupant detection sensors 140. The occupant detection sensors 140 generate data that may be received at the operation 702, and the operation 706 includes using the data to determine whether and which of the seats 114 are occupied. For example, the operation 706 may be carried out the presence detection component 148 discussed above.

At an operation 708, the process 700 includes determining a presence of cargo. For example, as discussed above, the vehicle 100 may be configured to define the volume 126 under the seats 114, e.g., to store cargo 128. As also discussed above, the vehicle 100 can also include the associated cargo detection sensors 142. The cargo detection sensors 142 generate data that may be received at the operation 702, and the operation 708 includes using the data to determine whether and which of the seats 114 have associated cargo thereunder. For example, the operation 708 may be carried out the presence detection component 148 discussed above.

At an operation 710, the process 700 includes deploy one or more airbags and/or one or more barriers based at least in part on the direction of travel, the presence of the occupant(s), and/or the presence of the cargo. In examples, discussed above, the operation 712 can include causing one or more of the airbags 138, the airbag 212, the airbag 312, the net 414 and/or some other barrier to be deployed to occlude a volume under a seat, e.g., to counteract lower legs of an occupant from extending into the volume and/or to prevent cargo from being ejected from the volume. As detailed above, in some examples, the airbag controller(s) 152 can be configured to determine which airbags are to be deployed. For instance, airbags associated with rear-facing seats in which an occupant is seated may be deployed, e.g., to reduce or prevent injury to the occupant's lower legs and knees. In another example, airbags and/or other barriers associated with a seat under which cargo is stowed may be deployed, regardless of the direction of travel, e.g., to prevent the cargo from being ejected out of the volume during a collision. Other scenarios for deploying airbags and/or other types of barriers are detailed herein, and still others will be appreciated by those having ordinary skill in the art, with the benefit of this disclosure.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A: An example vehicle includes: a body defining a passenger compartment having a floor; a seat disposed in the passenger compartment and including a seat portion configured to support an occupant, a bottom of the seat portion being spaced vertically from the floor, defining a volume under the seat; and an inflatable airbag disposed in the seat portion in a deflated configuration and being selectively inflated to an inflated configuration, wherein in the inflated configuration, the inflatable airbag extends from the bottom of the seat portion toward the floor to at least partially occlude an opening to the volume under the seat.

B: The vehicle of example A, further comprising a controller configured to: determine a direction of travel of the vehicle; and cause the inflatable airbag to be configured in the inflated configuration at least in part based on the occupant in the seat facing opposite the direction of travel of the vehicle, the airbag in the inflated configuration providing support to the back of lower legs of the occupant.

C: The vehicle of example A or example B, further comprising: a sensor configured to determine presence of cargo in the volume; and a controller configured to cause the inflatable airbag to be configured in the inflated configuration at least in part based on the cargo being present in the volume.

D: The vehicle of any one of example A through example C, further comprising: a barrier disposed in the seat portion in stowed configuration and being selectively deployed to a deployed configuration, wherein in the deployed configuration, the barrier extends from the bottom of the seat portion toward the floor to at least partially occlude the opening to the volume under the seat.

E: The vehicle of any one of example A through example D, further comprising: a cover disposed over at least one of the airbag in the deflated configuration or the barrier in the stowed configuration; and an actuator for moving the cover to facilitate at least one of the airbag to be configured in the inflated configuration or the barrier to be deployed to the deployed configuration.

F: The vehicle of any one of example A through example E, further comprising: a first coupling mechanism associated with at least one of the inflatable airbag or the barrier; and a second coupling mechanism associated with the vehicle, the first coupling mechanism being configured to cooperatively couple with the second coupling mechanism when the inflatable airbag is in the inflated configuration or the barrier is in the deployed configuration.

G: An example occupant protection system for a vehicle, the occupant protection system comprising: an inflatable airbag configured to be selectively inflated to an inflated configuration, wherein, in the inflated configuration, the inflatable airbag at least partially occludes an opening, wherein the opening is to a volume under a seat of a vehicle.

H: The occupant protection system of example G, wherein: the inflatable airbag is coupled to the seat; and in the inflated configuration, the inflatable airbag extends from a bottom of the seat portion toward a floor of the vehicle.

I: The occupant protection system of example G or example H, wherein the seat includes a cavity and the inflatable airbag is disposed in the cavity in an uninflated configuration.

J: The occupant protection system of any one of example G through example I, further comprising: a cover disposed over the cavity with the inflatable airbag in the uninflated configuration, wherein the selective inflation of the inflatable airbag causes the cover to move relative to the cavity.

K: The occupant protection system of any one of example G through example J, wherein: the inflatable airbag is coupled to the floor; and in the inflated configuration, the inflatable airbag extends from the floor toward a bottom of the seat.

L: The occupant protection system of any one of example G through example K, further comprising: a physical barrier proximate the opening and selectively configurable between a stowed position and a deployed position at least partially occluding the opening.

M: The occupant protection system of any one of example G through example L, wherein the physical barrier comprises at least one of a solid member or a net.

N: The occupant protection system of any one of example G through example M, further comprising: a first coupling mechanism associated with the physical barrier; and a second coupling mechanism associated with the vehicle, the first coupling mechanism being configured to cooperate with the second coupling mechanism when the barrier is in the deployed position to retain the barrier in the deployed position.

O: The occupant protection system of any one of example G through example N, further comprising: a controller configured to cause the inflatable airbag to be configured in the inflated configuration at least in part in response to a collision event.

P: The occupant protection system of any one of example G through example O, wherein: the controller is configured to cause the inflatable airbag to be configured in the inflated configuration at least in part based on one or more of first data associated with a presence of an occupant in the seat, second data associated with a presence of cargo in the volume, or a direction of travel of the vehicle.

Q: An example method of protecting an occupant in a vehicle, the vehicle comprising a body defining a passenger compartment having a floor; a seat disposed in the passenger compartment and including a seat portion configured to support an occupant, a bottom of the seat portion being spaced vertically from the floor to define a volume under the seat; and an inflatable airbag, the method comprising: determining information associated with an impact of the vehicle; and configuring, based at least in part on the information, the inflatable airbag in an inflated configuration at least partially occluding an opening to the volume under the seat.

R: The method of example Q, further comprising receiving data indicating that an occupant is present in the seat, wherein the configuring the inflatable airbag in the inflated configuration is based at least in part on the occupant being present in the seat.

S: The method of example Q or example R, further comprising receiving sensor data from a sensor indicating that cargo is disposed in the volume, wherein the configuring the inflatable airbag in the inflated configuration is based at least in part on the cargo being disposed in the volume.

T: The method of any one of example Q through example S, further comprising determining a direction of travel of the vehicle, wherein the configuring the inflatable airbag in the inflated configuration is based at least in part on the direction of travel of the vehicle.

What is claimed is:

1. A vehicle comprising:
   a body defining a passenger compartment having a floor;
   a seat disposed in the passenger compartment and including a seat portion configured to support an occupant, a bottom of the seat portion being spaced vertically from the floor, defining a volume under the seat;
   an inflatable airbag disposed in the seat portion in a deflated configuration and being selectively inflated to an inflated configuration, wherein in the inflated configuration, the inflatable airbag extends from the bottom of the seat portion toward the floor to at least partially occlude an opening to the volume under the seat; and
   a controller configured to:
      determine a direction of travel of the vehicle; and
      cause the inflatable airbag to be configured in the inflated configuration at least in part based on the occupant in the seat facing opposite the direction of travel of the vehicle, the airbag in the inflated configuration providing support to the back of lower legs of the occupant.

2. The vehicle of claim 1, further comprising:
   a sensor configured to determine presence of cargo in the volume, wherein the controller is further configured to cause the inflatable airbag to be configured in the inflated configuration at least in part based on the cargo being present in the volume.

3. The vehicle of claim 1, further comprising:
a barrier disposed in the seat portion in stowed configuration and being selectively deployed to a deployed configuration, wherein in the deployed configuration, the barrier extends from the bottom of the seat portion toward the floor to at least partially occlude the opening to the volume under the seat.

4. The vehicle of claim 3, further comprising:
a cover disposed over at least one of the airbag in the deflated configuration or the barrier in the stowed configuration; and
an actuator for moving the cover to facilitate at least one of the airbag to be configured in the inflated configuration or the barrier to be deployed to the deployed configuration.

5. The vehicle of claim 3, further comprising:
a first coupling mechanism associated with at least one of the inflatable airbag or the barrier; and
a second coupling mechanism associated with the vehicle, the first coupling mechanism being configured to cooperatively couple with the second coupling mechanism when the inflatable airbag is in the inflated configuration or the barrier is in the deployed configuration.

6. An occupant protection system for a vehicle, the occupant protection system comprising:
an inflatable airbag configured to be selectively inflated to an inflated configuration, wherein, in the inflated configuration, the inflatable airbag at least partially occludes an opening, wherein the opening is to a volume under a seat of a vehicle; and
a physical barrier proximate the opening and selectively configurable between a stowed position and a deployed position at least partially occluding the opening.

7. The occupant protection system of claim 6, wherein:
the inflatable airbag is coupled to the seat; and
in the inflated configuration, the inflatable airbag extends from a bottom of the seat portion toward a floor of the vehicle.

8. The occupant protection system of claim 6, wherein the seat includes a cavity and the inflatable airbag is disposed in the cavity in an uninflated configuration.

9. The occupant protection system of claim 8, further comprising:
a cover disposed over the cavity with the inflatable airbag in the uninflated configuration,
wherein the selective inflation of the inflatable airbag causes the cover to move relative to the cavity.

10. The occupant protection system of claim 6, wherein:
the inflatable airbag is coupled to the floor; and
in the inflated configuration, the inflatable airbag extends from the floor toward a bottom of the seat.

11. The occupant protection system of claim 6, wherein the physical barrier comprises at least one of a solid member or a net.

12. The occupant protection system of claim 6, further comprising:
a first coupling mechanism associated with the physical barrier; and
a second coupling mechanism associated with the vehicle, the first coupling mechanism being configured to cooperate with the second coupling mechanism when the barrier is in the deployed position to retain the barrier in the deployed position.

13. The occupant protection system of claim 6, further comprising:
a controller configured to cause the inflatable airbag to be configured in the inflated configuration at least in part in response to a collision event.

14. The occupant protection system of claim 13, wherein:
the controller is configured to cause the inflatable airbag to be configured in the inflated configuration at least in part based on one or more of first data associated with a presence of an occupant in the seat, second data associated with a presence of cargo in the volume, or a direction of travel of the vehicle.

15. A method of protecting an occupant in a vehicle, the vehicle comprising a body defining a passenger compartment having a floor; a seat disposed in the passenger compartment and including a seat portion configured to support an occupant, a bottom of the seat portion being spaced vertically from the floor to define a volume under the seat; and an inflatable airbag, the method comprising:
determining information associated with an impact of the vehicle;
receiving data indicating that an occupant is present in the seat; and
configuring, based at least in part on the information and the occupant being present in the seat, the inflatable airbag in an inflated configuration at least partially occluding an opening to the volume under the seat.

16. The method of claim 15, further comprising:
receiving sensor data from a sensor indicating that cargo is disposed in the volume,
wherein the configuring the inflatable airbag in the inflated configuration is based at least in part on the cargo being disposed in the volume.

17. The method of claim 15, further comprising:
determining a direction of travel of the vehicle,
wherein the configuring the inflatable airbag in the inflated configuration is based at least in part on the direction of travel of the vehicle.

18. An occupant protection system for a vehicle, the occupant protection system comprising:
an inflatable airbag configured to be selectively inflated to an inflated configuration, wherein, in the inflated configuration, the inflatable airbag at least partially occludes an opening, wherein the opening is to a volume under a seat of a vehicle; and
a controller configured to cause the inflatable airbag to be configured in the inflated configuration at least in part based on data associated with a presence of cargo in the volume.

19. The occupant protection system of claim 18, wherein the controller is further configured to cause the inflatable airbag to be configured in the inflated configuration at least in part in response to a collision event.

20. The occupant protection system of claim 18, wherein the controller is configured to cause the inflatable airbag to be configured in the inflated configuration at least in part based on one or more of additional data associated with a presence of an occupant in the seat or a direction of travel of the vehicle.

* * * * *